Nov. 4, 1969

D. M. WILLYOUNG 3,476,964

MULTIPLE CIRCUIT ARMATURE WINDING FOR POLYPHASE
DYNAMOELECTRIC MACHINE

Filed July 15, 1968

INVENTOR:
DAVID M. WILLYOUNG,

BY *W. C. Crutcher*

HIS ATTORNEY.

Nov. 4, 1969         D. M. WILLYOUNG         3,476,964
MULTIPLE CIRCUIT ARMATURE WINDING FOR POLYPHASE
DYNAMOELECTRIC MACHINE
Filed July 15, 1968                          2 Sheets-Sheet 2

72 SLOT
3 PHASE
4 POLE
3 CIRCUIT

INVENTOR:
DAVID M. WILLYOUNG,
BY *W. C. Crutchen*
HIS ATTORNEY.

United States Patent Office 3,476,964
Patented Nov. 4, 1969

3,476,964
MULTIPLE CIRCUIT ARMATURE WINDING FOR POLYPHASE DYNAMOELECTRIC MACHINE
David M. Willyoung, Scotia, N.Y., assignor to General Electric Company, a corporation of New York
Filed July 15, 1968, Ser. No. 745,030
Int. Cl. H02k 3/04
U.S. Cl. 310—198       5 Claims

ABSTRACT OF THE DISCLOSURE

A generator armature winding for a three-phase four-pole generator with three parallel-connected circuits per phase, wherein for each phase two of the four phase belts have coil sides of only one circuit each, and the other two phase belts have only two circuits each, thereby simplifying end connections.

Background of the invention

Figure 1:
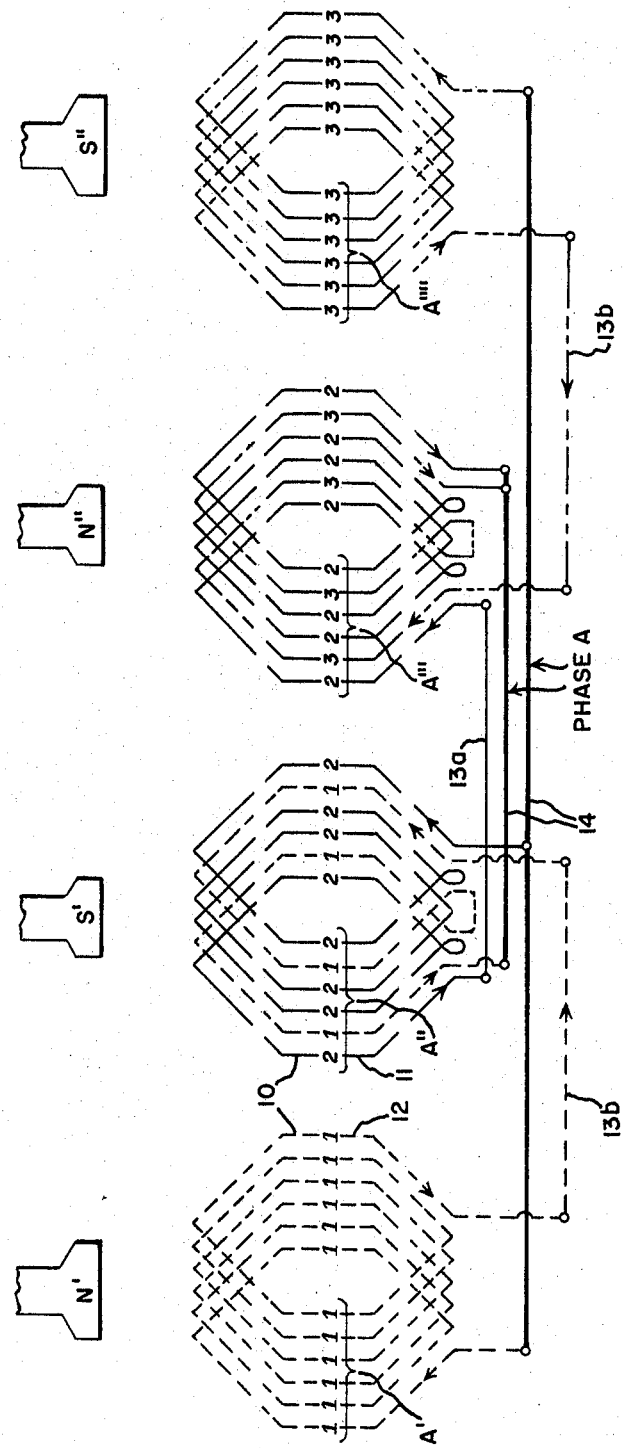

The present invention relates to armature winding for large polyphase generators, and more particularly, is an improvement over U.S. Patent 3,201,627 issued to Dean B. Harrington on Aug. 17, 1965 and assigned to the assignee of the present invention. The aforesaid patent, which is incorporated herein by reference, describes a number of winding patterns for four-pole, three-phase armature windings having three parallel-connected circuits per phase. The patterns illustrated in that patent for a 72 slot core structure give a high degree of balance among the three parallel-connected circuits, both with respect to magnitude of voltage unbalance and quadrature unbalance (phase angle displacement) between a given circuit and the phase.

Although the winding patterns disclosed in that patent are quite suitable from an electrical standpoint, in that there is only negligible increased relative heating due to the circulating currents between the three parallel-connected circuits, there are some mechanical complexities involved in use of the patterns. This is because of the large number of "jumper connections" required between poles for the earlier patterns. These jumpers must be nested into the spaces between connection rings which may result in extending the length of the generator. In addition, each connection point between an armature bar and either a connection ring or a jumper connection constitutes a point of added mechanical congestion which can rapidly become intolerable if any excessive number of adjacent armature bars require such connections. Also in machines of very high rating, such as would use such patterns, the windings are often liquid-cooled, requiring hose connections to each coil. It is necessary to provide space for these hoses as well as the jumpers. This may also result in extending the length of the machine. Therefore, it is desired to make the arrangement of pole-to-pole circuit jumpers and connection rings in the end turn region as simple as possible.

In the patterns of the aforesaid patent, as many as nine or ten axially spaced positions of the connection rings were used, which increased the overall generator length. In the specific examples described there, coil sides from one of the circuits in each phase appeared on three of the four poles, while coil sides from the other two circuits appeared on two poles each. This arrangement required a minimum of 14 connection points to the armature winding per phase, where the armature bar connected to either a jumper connection or to a "connection ring." (The term "connection ring" in this application is intended to describe one of the electrical connections between the armature conductors and the terminal bushings of the machine.) The large total of 42 winding points for the three phase machine (2=14×3) causes much congestion and difficulty in obtaining proper support, electrical clearances and sufficient accessibility at the connection points to the winding, as well as making it difficult to nest the connection rings and the pole to pole jumper connections into a compact assembly. However, despite the mechanical problems, the electrical balance of the specific winding patterns described in the aforesaid patent, all of which are electrical equivalents of each other, was excellent, with only a small quadrature unbalance and a small in-phase unbalance between circuits.

The primary overriding advantage of the present invention lies in the simplification of the end connections over the aforesaid Harrington patent. However, the electrical unbalance between circuits is such that circulating currents are also slightly reduced for the particular embodiment (i.e. reactance level, winding pitch, and rating) described.

Accordingly, one object of the present invention is to provide an improved three-phase, four-pole winding having three parallel-connected circuits per phase, wherein the coil sides of the circuits are placed in such a way as to simplify the end winding connections.

Another object of the present invention is to provide an improved three-phase, four-pole, 72-slot armature winding having three parallel-connected circuits per phase, wherein there is a minimum number of different circuits in each phase belt, and also having no quadrature unbalance between a given circuit and the phase.

Still another object is to provide an improved three-phase, four-pole, 72 slot armature winding having three parallel-connected circuits per phase, with suitably low electrical unbalance between circuits so that circulating currents are inconsequential.

Drawing

Figure 2:
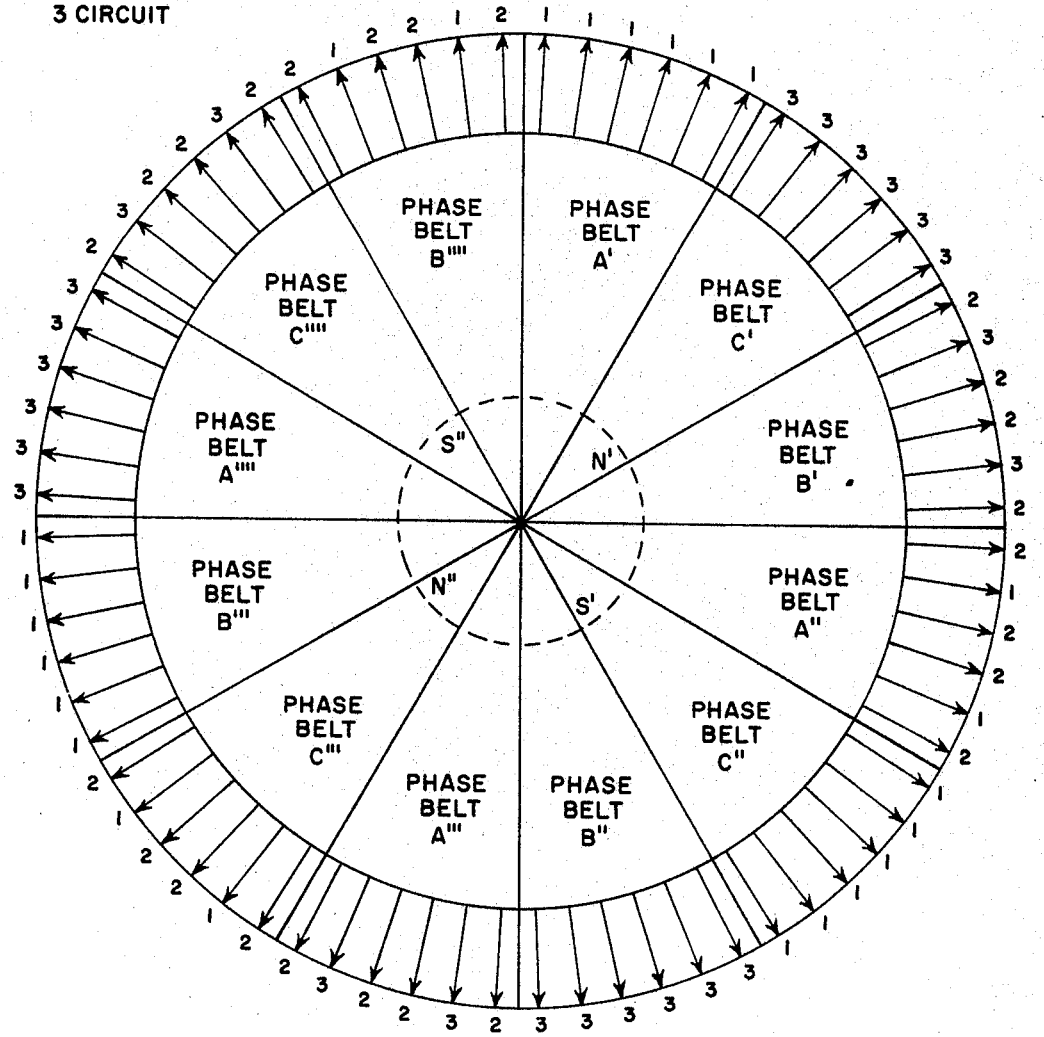

The invention, both as to organization and method of practice, together with further objects and advantages thereof, will best be understood by reference to the following specification, taken in connection with the accompanying drawings, in which:

FIG. 1 is a diagrammatic illustration of a dynamoelectric machine armature winding embodying the invention, the winding being for a four-pole, three-phase, 72 slot construction of unspecified winding pitch, and having three parallel-connected circuits per phase, only one phase of the three-phase winding being illustrated, and FIG. 2 is a combined schematic diagram of the phase belt arrangement in the winding and a vectorial diagram of phase voltage components for all three circuits of all three phases.

Summary of the invention

Briefly stated, the invention is practiced by providing a winding pattern for a four-pole, three-phase machine having three parallel-connected circuits per phase, wherein the circuit patterns are arranged in each phase belt so that half of the phase belts contain coil sides of only one circuit (single-circuit phase belts) and the remainder of the phase belts contain coil sides of only two circuits (double-circuit phase belts), these being all symmetrically arranged so that no quadrature unbalance exists.

Description

Referring to FIG. 1 of the drawing, there is shown a developed view of a stationary armature winding for disposition in the slots of a laminated core structure (not shown). A rotary field element represented by the poles indicated at N', S', N", S" induces voltages in the slot portions 10 of the winding.

In FIG. 1, only one phase of the winding is illustrated, it being understood by those skilled in the art that the remaining phases B and C are identical but displaced 120 mechanical degrees in the generator core structure. Also FIG. 1 is illustrated in a manner which does not specify the coil pitch, it being understood by those skilled in the art that such windings are generally chorded, such that top coil sides such as 11 will overlap bottom coil sides such as 12 in the two layer winding.

FIG. 2, on the other hand, is drawn to specifically illustrate all three phases as well as to illustrate the winding as specifically applied to a 72 slot core structure.

Referring back to FIG. 1 of the drawing, the two positive phase belts are indicated as A′, A′′′, while the negative phase belts for A phase are illustrated as A′′, A′′′′. The bracketed phase belts also indicate the top layer coil sides which overlap the bottom layer coil sides in actuality, in accordance with the selected pitch.

There are three parallel-connected circuits in phase A (as well as in the other phases which are not shown in FIG. 1). These are arbitrarily designated as circuits 1, 2 and 3, although any designation could be employed and it will be understood that the numbers can be interchanged without changing the electrical pattern and that the letters or numbers used to designate and to differentiate between the circuits do not limit the scope of the invention.

Circuit 1 is indicated in dashed lines, circuit 2 in solid lines, and circuit 3 in dot-dash lines. Pole-to-pole jumpers 13a, 13b are employed to connect elements of the same circuit in two adjacent phase belts. Connection rings 14 serve to provide a connection from circuits 1, 2 and 3 to the machine terminals.

It will be apparent from FIG. 1 that phase belt A′ contains coil sides of circuit 1 only; phase belt A′′ contains coil sides of circuits 1 and 2; phase belt A′′′ contains coil sides of circuits 2 and 3; and phase belt A′′′′ contains coil sides of circuit 3 only. Therefore, two of the four phase belts have coil sides of only one circuit each. These are designated "single-circuit" phase belts.

It will also be observed that with respect to phase belts A′′ and A′′′, which each contain coil sides of two circuits, the circuit pattern is such that the coil sides are symmetrically disposed within the phase belt, i.e., 2 1 2 2 1 2 and 2 3 2 2 3 2 respectively. These are designated "double-circuit" phase belts. Circuit-2 coil sides are common to both of the phase belts A′′, A′′′ and are disposed in the same manner in each, i.e., 2–22–2, 2–22–2.

The foregoing symmetrical distribution is accomplished by utilizing a single pole-to-pole jumper 13a to connect coil sides of circuit 2 which are disposed symmetrically as indicated in the slots of the two center phase belts. Phase belts A′ and A′′′′ are composed solely of coil sides of circuits 1 and 3 respectively. The additional circuit 1 and 3 coil sides necessary to complete the winding are disposed in the remaining slots of phase belts A′′, A′′′ and connected to the two endmost phase belts A′, A′′′′, utilizing pole-to-pole jumpers 13b.

It will be noted that for this arrangement there are 12 connection points between the armature bars and either the end connection rings 14 or phase belt jumper connections 13a and 13b, for each phase. These connection points are designated by small circles. The total for the three phases is 36 (36=12×3) which is a 14.3% reduction compared to the minimum of 42 connection points required in the aforementioned Harrington patent. In addition, mechanical symmetry between phase belts reduces the mechanical complexity.

The arrangement and distribution of circuits 1, 2 and 3 in the four phase belts A′, A′′, A′′′, and A′′′′ in terms of both the occurrences and the positions thereof in the winding slots are summarized in Table I below. The electrical displacement between slots in a 72 slot 4 pole machine is 10°, so that relative to the centerline of the phase belts, slot 1 falls at +25°, slot 2 at +15°, etc. as Table I also shows.

TABLE I

| | Slot Position | | | | | |
|---|---|---|---|---|---|---|
| | 1 | 2 | 3 | 4 | 5 | 6 |
| | Electrical Angle | | | | | |
| | +25° | +15° | +5° | −5° | −15° | −25° |
| Pole N′ | 1 | 1 | 1 | 1 | 1 | 1 |
| Pole S′ | 2 | 1 | 2 | 2 | 1 | 2 |
| Pole N′′ | 2 | 3 | 2 | 2 | 3 | 2 |
| Pole S′′ | 3 | 3 | 3 | 3 | 3 | 3 |

Accordingly, circuit 1 appears once in a first slot position (+25°), twice in a second slot position (+15°), once in a third slot position (+5°), once in a fourth slot position (−5°), twice in a fifth slot position (−15°), and once in a sixth slot position (−25°).

Circuit 2 appears twice in a first slot position, at no time in a second slot position, twice in a third slot position, twice in a fourth slot position, at no time in a fifth slot position, and twice in a sixth slot position.

Circuit 3 is the same as circuit 1 with respect to the various slot positions.

As a matter of convenience, this relationship is set forth in Table II appearing below:

TABLE II

| | Slot Position | | | | | |
|---|---|---|---|---|---|---|
| | 1 | 2 | 3 | 4 | 5 | 6 |
| Circuit "1" | X | XX | X | X | XX | X |
| Circuit "2" | XX | | XX | XX | | XX |
| Circuit "3" | X | XX | X | X | XX | X |

It will be evident to those skilled in the art that alternate mechanical arrangements of the winding can be obtained without altering the electrical balance between circuits by merely interchanging poles N′, S′, N′′, or S′′ in any desired order, taking proper account of magnetic polarity as this is done. It is intended that all such mechanical alternates producing the generalized circuit location pattern shown in Table II be included in the scope of this patent.

As a means of evaluating the unbalance between parallel-connected circuits in a phase, the following definitions are commonly employed. The p.u. (per unit) voltage of only one of a number of parallel circuits in a phase comprises the ratio between the open-circuit voltage generated in the one circuit and the rated voltage of the phase, and is a measurement of the voltage magnitude unbalance between the one circuit and the total phase. Similarly, the phase-angle displacement between the open-circuit voltage generated in the one circuit and the rated voltage of the phase is a measurement of the phase angle of unbalance between the one circuit and the phase.

TABLE III

| | Circuit | | |
|---|---|---|---|
| | 1 | 2 | 3 |
| Voltage Magnitude (p.u.) | 1.0026 | .9949 | 1.0026 |
| Voltage Phase Angle (radius) | .0000 | .0000 | .0000 |

As indicated in Table III, there is a high degree of balance among the three parallel-connected circuits 1, 2 and 3. There is a very low magnitude of voltage unbalance and there is no phase angle displacement or quadrature unbalance between circuits. In the latter respect, it follows that the pattern offers improved convenience in mechanical connections and arrangements because of the symmetrical distribution, while providing only negligible increased relative heating as compared to an exactly balanced winding.

It will be understood that the relative heating in the armature winding is dependent upon the coil pitch as well as the other design factors, such as the rated flux per pole. For one particular design, the relative heating in the circuit having the greatest heating is calculated to have the values as set forth in Table IV below:

TABLE IV

| Pitch: | Relative heating |
|---|---|
| 12/18 | 1.016 |
| 13/18 | 1.047 |
| 14/18 | 1.008 |
| 15/18 | 1.035 |
| 16/18 | 1.094 |
| 17/18 | 1.018 |

Table IV was prepared from the same design data as those used for the comparable Table IV in U. S. Patent 3,201,627, in order to provide an exact comparison, and it is seen that the relative heating values are somewhat higher. However, in higher reactance machines more typical of larger ratings, the invention provides lower relative heating, e.g., for such a 15/18 pitch generator, the relative heating factor is 1.0113 for the present invention versus 1.0119 for the earlier pattern. Therefore, improvements from this standpoint are possible through the use of the invention. It is believed that those skilled in the art will understand FIG. 2, noting that a phasor diagram can be constructed from FIG. 2 by rotating the vectors of the coils of phase belts A″, A‴, and A⁗ counterclockwise by 90°, 180° and 270° respectively; likewise phase belts B⁗, B′, and B″ by 90°, 180° and 270° and C‴, C⁗ and C′ by 90°, 180° and 270° respectively.

The foregoing winding pattern provides slightly improved electrical benefits relative to the aforementioned U.S. Patent 3,201,627, but in addition provides a pronounced improvement in ease of constructing a generator from the mechanical design standpoint. For example, whereas 42 winding connection leads and 9 or 10 axially spaced locations for the pole-to-pole jumpers and connection rings were previously required at one end of the generator, the present invention requires only 36 winding connection leads and allows nesting of the jumpers and connection rings into only 8 axial positions.

In view of the foregoing, it is apparent that there has been disclosed an improved polyphase armature winding which is effective to provide a symmetrical circuit pattern which has no quadrature unbalance and which simplifies the end winding connections from a mechanical standpoint.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. A dynamoelectric machine comprising a polyphase four-pole winding, each phase of said winding being arranged in four phase belts and including three parallel-connected circuits, each circuit of each phase of said winding including a given number of series-connected coils each having two coil sides, two of said phase belts each containing coil sides of only a single circuit therein.

2. The combination according to claim 1, wherein the other two phase belts are each double-circuit, and each containing coil sides of only two circuits therein, there being a circuit common to both of said double-circuit phase belts.

3. The combination according to claim 2, wherein the coil sides of said common circuit are disposed in the same respective slot positions in each of the two double-circuit phase belts.

4. A dynamoelectric machine comprising a polyphase four-pole winding, each phase of said winding being arranged in four phase belts and including three parallel-connected circuits, each circuit in each phase of said winding including a given number of series-connected coils each having two coil sides,
   a first phase belt having only coils of the first circuit therein,
   a second phase belt including coils of the first and second circuits therein,
   a third phase belt including coils of the second and third circuits therein, and
   a fourth phase belt having only coils of the third circuit therein.

5. The combination according to claim 4 wherein said winding is disposed in a 72 slot core, said circuits are designated 1, 2, 3, and wherein the adjacent coil sides in the respective phase belts are disposed in the sequence:

| Phase belt: | Circuit sequence |
|---|---|
| First | 111111 |
| Second | 212212 |
| Third | 232232 |
| Fourth | 333333 |

References Cited

UNITED STATES PATENTS

| 2,778,963 | 1/1957 | Habermann | 310—202 |
| 3,152,273 | 10/1964 | Harrington | 310—198 |
| 3,201,627 | 8/1965 | Harrington | 310—198 |
| 3,408,517 | 10/1968 | Willyoung | 310—198 |

WARREN E. RAY, Primary Examiner

U.S. Cl. X.R.

310—202